United States Patent
Pearce

[11] Patent Number: 5,639,198
[45] Date of Patent: Jun. 17, 1997

[54] HAY BALE LOADER

[76] Inventor: Arthur W. Pearce, 3251 Victoria, Weering, Australia

[21] Appl. No.: 470,131

[22] Filed: Jun. 6, 1995

[51] Int. Cl.$^6$ ............................................. A01D 90/08
[52] U.S. Cl. .................. 414/24.5; 414/493; 414/553
[58] Field of Search ........................ 414/24.5, 491, 414/493, 501, 502, 503, 505, 546, 553, 556, 641

[56] References Cited

U.S. PATENT DOCUMENTS

| | | | |
|---|---|---|---|
| 3,999,674 | 12/1976 | Meitl | 414/501 |
| 4,084,707 | 4/1978 | McFarland | 414/501 |
| 4,264,252 | 4/1981 | Jennings et al. | 414/24.5 |
| 4,597,703 | 7/1986 | Bartolini | 414/24.5 |
| 5,090,630 | 2/1992 | Kopecky et al. | 414/24.5 |
| 5,320,472 | 6/1994 | Matlack et al. | 414/24.5 |

*Primary Examiner*—David A. Bucci
*Assistant Examiner*—Douglas Hess
*Attorney, Agent, or Firm*—Sughrue, Mion, Zinn, Macpeak & Seas

[57] ABSTRACT

A bale loader has a supporting frame with a secondary frame pivotally attached. The secondary frame carries a movable platform in guides and a pair of tynes are pivotally mounted at one end of the platform. A hydraulic cylinder connected between the frames causes the secondary frame to be moved between an upright, loading position and a generally horizontal delivery position. A chain connected between the platform and the secondary frame passes around a sprocket on the supporting frame so that the pivotal movement of the secondary frame is translated to movement of the platform in the guides. A second hydraulic cylinder activates lifting forks to tip a bale from the platform when in its delivery position.

11 Claims, 4 Drawing Sheets

HAY BALE LOADER

FIELD OF THE INVENTION

This invention relates to a hay bale loader and relates particularly to a bale loader which is adapted to lift a bale of hay from the ground and transfer the bale to a bale receiving station, which may be a feeder, a transporter or other apparatus.

The loader of the present invention may be used in conjunction with the hay bale feeder the subject of U.S. Pat. No. 4,545,716, and for convenience, the invention will be described for use in association with such a feeder. It will be understood, however, that the invention may be used in conjunction with other forms of apparatus, including transporters such as tray trailers, bale stackers and the like.

BACKGROUND OF THE INVENTION

Many forms of bale loaders have previously been proposed. Such loaders generally have forks or the like which engage a bale, the forks being movable to lift the bale to a desired position. However, most such loaders have difficulty in coping with the wide variety of non-uniform round hay bales. Further, because of the need to move a bale from the ground onto a cradle of a feeding machine, for example, a number of different movements are necessary and known loaders are therefore relatively complex and expensive.

In my U.S. Pat. No. 4,634,336 I have described a bale loader with a pair of arms carrying a transfer platform with bale-engaging tynes. A hydraulic cylinder moves the platform from an upright, loading position to a lifted position and a further cylinder lifts the platform and arms to discharge the hay bale onto a feeder. A disadvantage of this arrangement is that the second cylinder must move the total load comprising the arms, platform and hay bale thereon. Further, because hay bales vary greatly in shape and construction, and in weight, it is difficult to accurately predict when a bale may actually be discharged. A sliding carriage on the arms assists in ensuring that the bale is discharged at a predetermined time during pivotal movement of the arms although the bale may have already moved from the loader prior to movement of the carriage.

It is therefore an object to provide and improved bale loader which obviates at least some of the disadvantages of known loaders.

It is also desirable to provide an improved bale loader which is able to lift a bale from the ground and load the bale into the cradle of a feeding machine.

It is also desirable to provide an improved bale loader which is relatively simple in construction and is economical to manufacture.

It is also desirable to provide an improved bale loader which has minimum moving parts.

It is also desirable to provide an improved bale loader which is of rugged construction and is able to easily withstand the rigors of hay bale handling.

SUMMARY OF THE INVENTION

In accordance with one aspect of the invention there is provided hay bale loading apparatus comprising a main frame, a secondary frame pivoted to the main frame, frame moving means to pivotally move the secondary frame relative to the main frame between an upright, loading position and a generally horizontal, delivery position, a movable platform means on the secondary frame, guide means on the secondary frame to support and guide said platform means for movement thereon, tyne means pivotally mounted to the platform means, and platform moving means to move the platform means from a bale loading position, when the secondary frame is in its loading position, and a bale delivery position when the secondary frame is moved to its delivery position.

In one form of the invention bale tipping forks are pivotally mounted to the main frame and are movable to tip a bale which has been moved to the delivery position. The tipping forks extend from the pivotal mounting rearwardly along the main frame towards the pivotal mounting of the secondary frame. The forks lie alongside the secondary frame when that has been moved to the bale delivery position. An activating cylinder preferably moves the forks to lift a bale from the platform.

The frame moving means preferably comprises at least one hydraulic cylinder extending between the main frame and the secondary frame so as to effect pivotal movement of the secondary frame.

In a particularly preferred form of the invention, the platform moving means comprises a roller chain one end of which attached to the secondary frame and the other end of which is attached to the platform means. The chain engages a first sprocket rotatably mounted on the main frame and a second sprocket mounted coaxially with the pivot axis of the secondary frame. When the secondary frame is in the upright, loading position, the platform means moves under gravitational forces to the loading position, which is adjacent the lower end of the secondary platform. On pivotal movement of the secondary frame from the loading position, the lower end thereof moves away from the first sprocket thus causing the chain to move whereby the platform means is drawn along the guide means to the delivery position.

In order that the invention is more readily understood and put into practical form, one embodiment thereof will now be described with reference to the accompanying drawings.

DESCRIPTION OF THE PREFERRED EMBODIMENT

Figure 1:
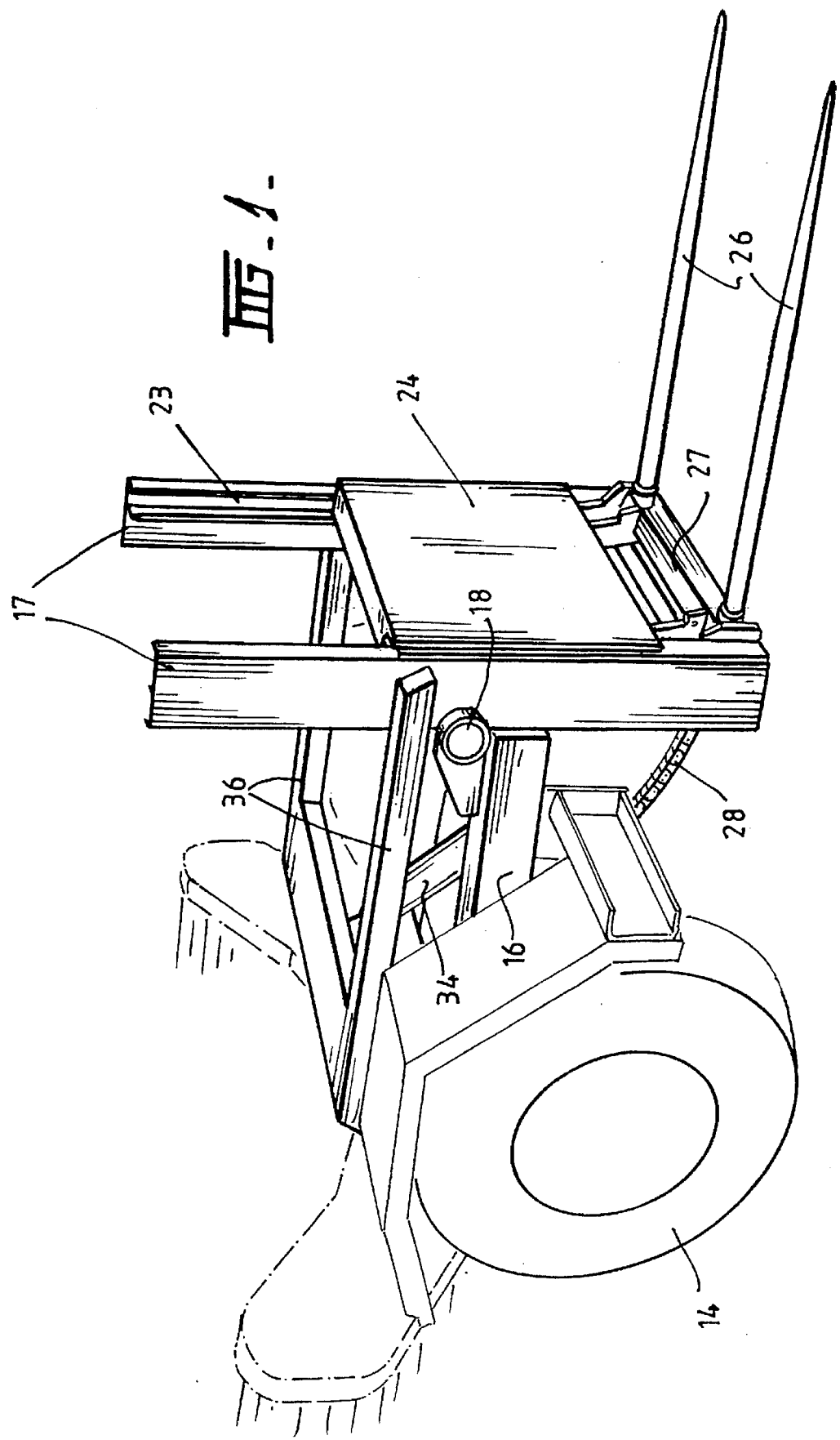
FIG. 1 is a perspective view of a hay bale loader of the invention.

Referring to the drawings, the hay bale loading apparatus of the embodiment illustrated is preferably mounted on the rear end of a bale feeder apparatus, such as that described in my U.S. Patent No. 4,545,716, which is drawn behind a prime mover, such as a tractor, and is supported on wheels 14 at its rear end. Frame members 16 of the feeder forms the main frame of the loader.

Figure 2:
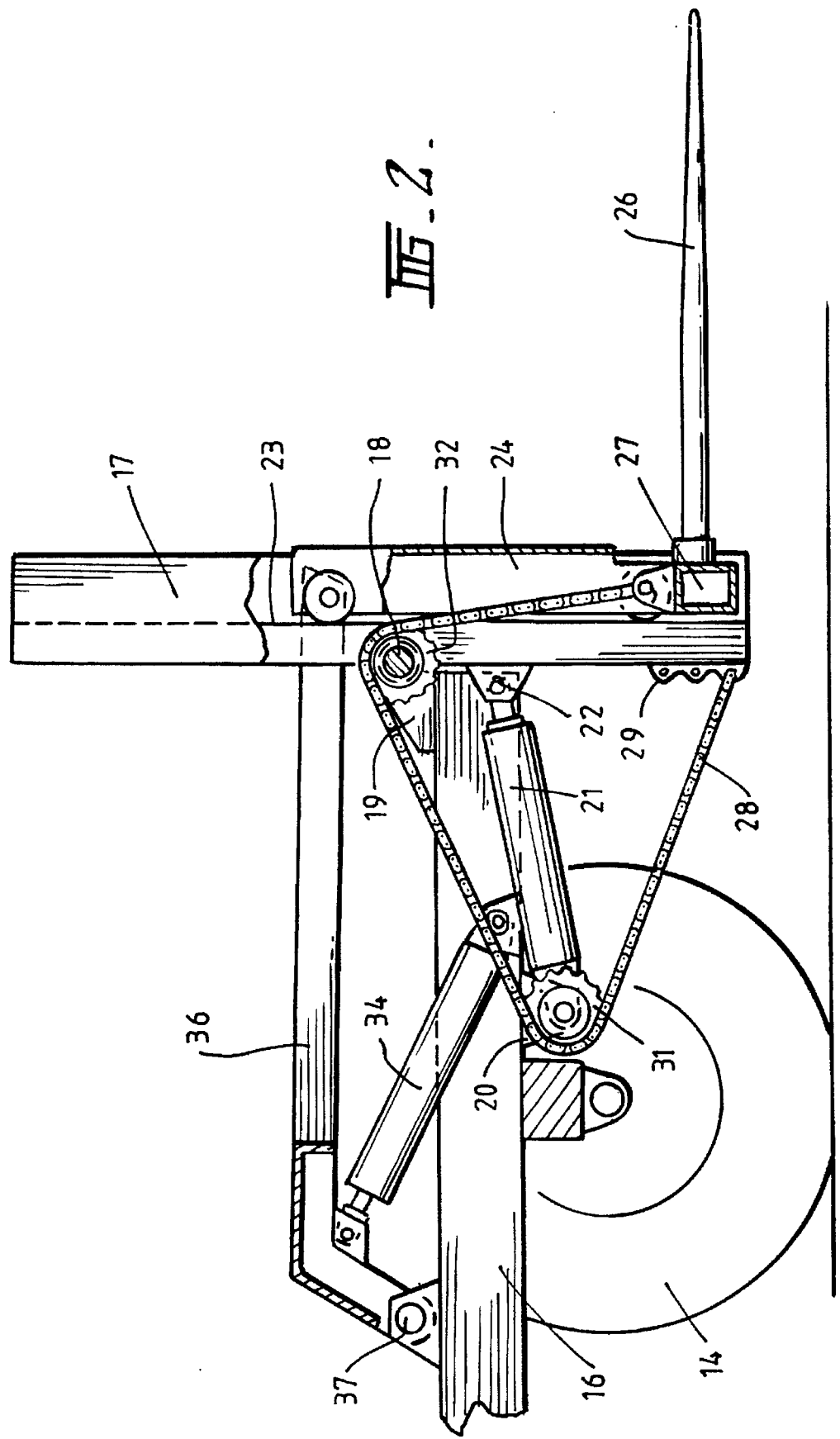
FIG. 2 is a side elevational view of the hay bale loader of the present invention showing the apparatus in a loading position.
Figure 3:
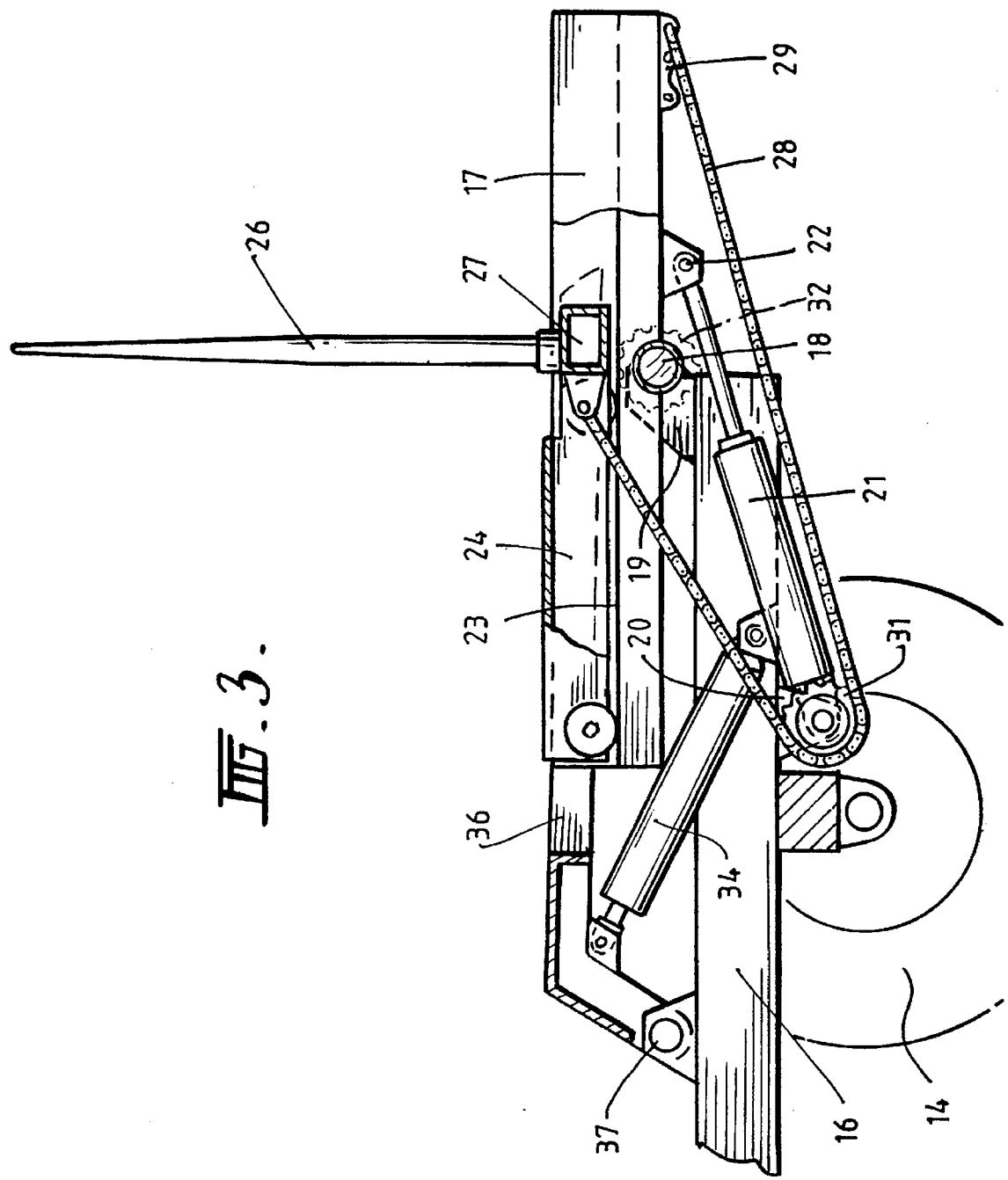
FIG. 3 is a view similar to FIG. 2 showing the loading apparatus in a delivery position.
Figure 4:
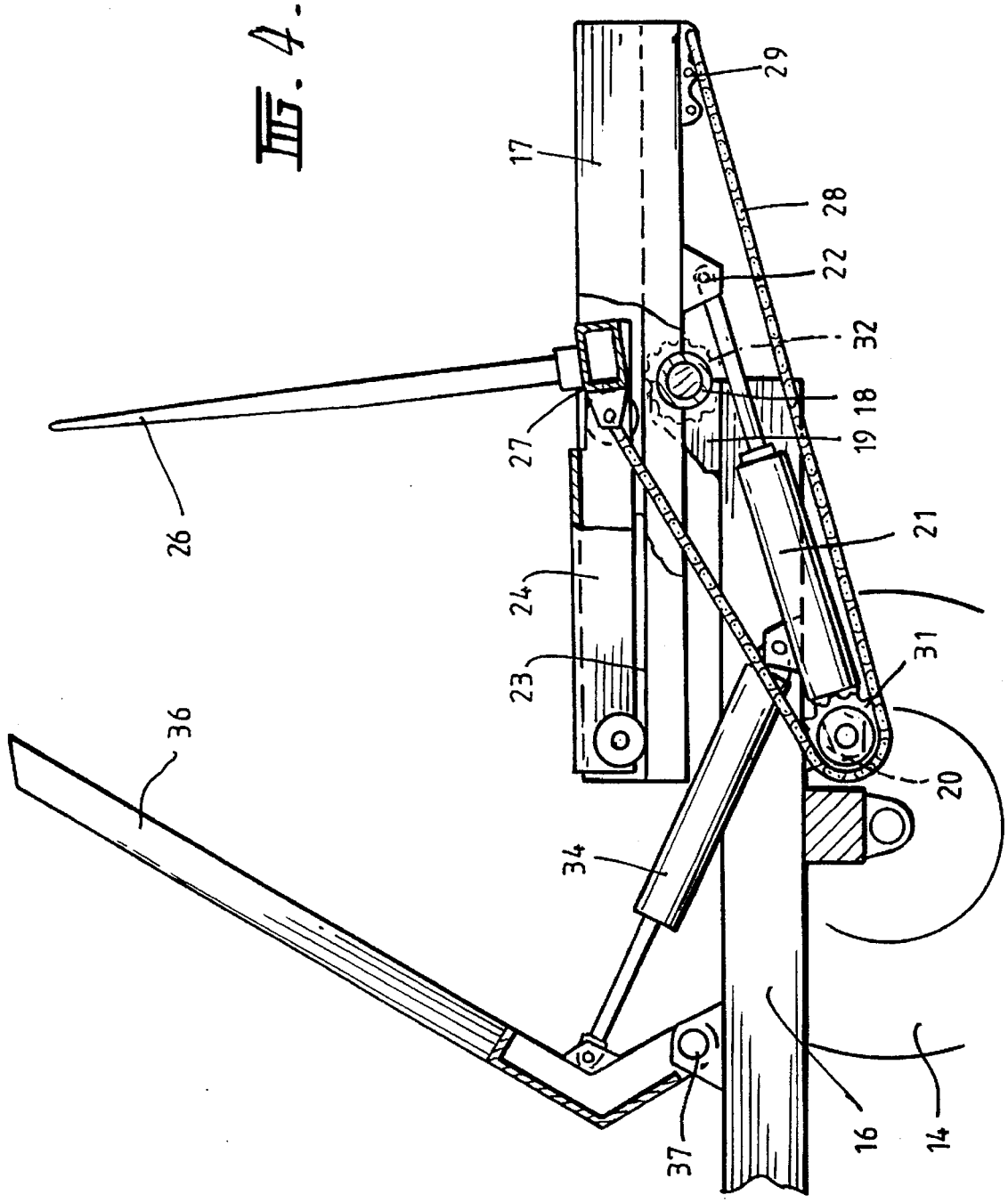
FIG. 4 is a view illustrating the operation of bale tipping forks.

The loader comprises a secondary frame 17 which is pivotally mounted to the main frame 16 by pivots 18 carried on supporting brackets 19 the pivot axis extending transversely of the main frame. The secondary frame 17 is movable between a substantially upright position, as shown in FIG. 2, and a generally horizontal position as shown in FIGS. 3 and 4. A cylinder 21, preferably a hydraulic cylinder, is provided at each side of the machine, each cylinder 21 being mounted at one end to a bracket 20 on the main frame 16 and having its other end connected to the secondary frame 17 by appropriate journals 22. If desired, a single cylinder only may be used to pivot the secondary frame 17.

The secondary frame 17 has a pair of spaced guide channels 23, and a wheeled platform 24 is carried by and is movable along the channels 23. At least two hay bale engaging tynes 26 are carried by a support 27 which is pivoted to the platform 24 at one end thereof. The tyne support 27 engages stops (not shown) on the platform 24 to restrict pivotal movement in the clockwise direction as shown in the drawings.

A flexible cable or chain, and preferably a roller chain 28, has one end connected to a bracket 29 located on the secondary frame 17. The bracket 29 has a plurality of attachment points enabling adjustment of the chain 28. The other end of the chain 28 is connected to the platform 24 at a position adjacent the connection of the pivotal support 27 to the platform 24. This connection may also be adjustable. The chain 28 passes around a first sprocket 31 carried on the hydraulic cylinder mounting bracket 20 on the main frame 16, which is spaced from the secondary frame pivot mounting axis. A second sprocket 32 is mounted coaxially with the secondary frame pivots 18 and is engageable by and is used as a guide for the roller chain 28 during operation of the loader. It will be understood that pulleys or other guide means may be used where a cable replaces a chain in use.

A pair of tipping forks 36 are pivoted to the main frame 16 and extend rearwardly towards the secondary frame 17 to lie alongside the platform 24 when that is in the delivery position. A second hydraulic cylinder 34 mounted at one end to the main frame 16 has its other end connected to the tipping forks 36 which, on actuation, pivot about the pivotal point 37.

In operation of the loader of the invention, the cylinders 21 are retracted so that the secondary frame 17 is moved to the upright loading position shown in FIGS. 1 and 2. In this position, the platform 24 moves to the lower end of the secondary frame 17 under the influence of gravitational forces and the tynes 26 extend generally horizontally. The frame 16 is moved by a prime mover so that the tynes 26 engage in one end of a hay bale to be loaded onto the feeding apparatus. Preferably, the tynes engage the bale some distance above the ground so that the bale is firmly impaled on the tynes through a relatively dense portion of the bale.

The hydraulic cylinders 21 are then actuated so as to pivot the secondary frame 17 about the pivot 18. This pivotal movement lifts the bale from the ground so that it is supported on the tynes as the secondary frame rotates. During such pivotal rotation, the lower end of the secondary frame carrying the brackets 29 moves away from the bracket 20 carrying the first sprocket 31. This causes the roller chain 28 to draw the platform 24 along the guide channels 23 of the secondary frame as the second leg of the chain 28 shortens. It will be understood that, in the loading position, the roller chain engages with and passes around the second sprocket 32 as shown in FIG. 2.

Continued pivotal rotation of the secondary frame 17 by the hydraulic cylinders 21 moves the frame 17 to the generally horizontal, delivery position shown in FIG. 3 at which the hay bale is now supported by the platform 24, which, in turn, has been caused by the roller chain 28 to move along the guide channels 23 to the other end (upper and forward end) of the secondary frame 17. In this position, the centre of mass of the bale acts through a point in front of the pivots 18 thus relieving the loading on the cylinders 21 which would otherwise occur. In the position shown in FIG. 3, the tynes 26 hold the bale secure for transportation if necessary.

To deliver the hay bale to the feeder, actuation of the second hydraulic cylinder 34 rotates the tipping forks 36 about the pivot 37 whereby the forks engage beneath the bale and move it from the platform 24. The pivotal mounting of the tynes 26 enable them to pivot forwardly, as shown in FIG. 4, enabling the bale to be cleanly and easily disengaged therefrom. The tipping forks 36 operate to tip the bale into the cradle of the feeder for subsequent distribution.

It will be appreciated that the structure of the present invention is relatively simple, utilizes only two hydraulic actions for total actuation and yet is able to move a hay bale from the ground to a supporting position and then to a feeder in such a way as to minimize stresses on the frame structures. The positive drive provided by the roller chain 28 to the platform 24 ensures that the bale is delivered from the ground to the supporting position at a location which facilitates tipping the bale onto the cradle of a feeder. Such positive movement during lifting also ensures that minimum forces are applied to the hydraulic cylinders 21 and 34 and their associated mounting brackets and attachment points.

The location of the end of the roller chain 28 and its attachment to the bracket 29 on the secondary frame 17 is adjustable to thereby vary the degree of movement of the platform 24 along the secondary frame 17. Other adjusting mechanisms may be used as desired.

If desired, a cable or other flexible tensioning means may be used in place of a roller chain 28. Further, the cylinders 21 and 34 may be actuated by pneumatic pressure instead of hydraulic as described.

I claim:

1. A bale loading apparatus, comprising:
    a main frame,
    a secondary frame pivotally attached to the main frame,
    frame drive means, operatively connected to said main frame and said secondary frame, to pivotally move said secondary frame relative to said main frame between an upright, loading position and a generally horizontal, delivery position,
    movable platform means moveably mounted on said secondary frame for supporting a loaded bale,
    guide means on said secondary frame to support and guide said platform means for movement thereon transversely to a pivot axis of said secondary frame,
    tyne means pivotally mounted to said platform means to engage a bale, and
    platform moving means to move said platform means within said guide means from a bale loading position, when said secondary frame is in its loading position, to a bale delivery position when said secondary frame is moved to its horizontal delivery position.

2. Apparatus according to claim 1, further comprising bale tipping means pivotally mounted to said main frame and being movable from a position adjacent said platform means when it is in the bale delivery position.

3. Apparatus according claim 2, wherein said bale tipping means comprises a pair of forks which, in the bale receiving position, extend from their pivotal mounting towards and adjacent said secondary frame, and at least one actuator means to move said forks to lift a bale from said platform means when in its bale delivery position.

4. Apparatus according to claim 1, wherein said frame moving means comprises at least one hydraulic cylinder extending between said main frame and said secondary frame to effect pivotal movement of said secondary frame.

5. Apparatus according to claim 1, wherein said guide means comprises spaced channels, and said platform means includes wheels engaged within the channels.

6. Apparatus according to claim 1, wherein said platform moving means comprises chain or cable means attached at one end to said secondary frame and attached at the other end to said platform means, said chain or cable means passing around a first sprocket means spaced from a pivot mount of said secondary frame to said main frame, said chain or cable means engageable with a second sprocket means tensioning the chain means.

7. Apparatus according to claim 6, wherein said second sprocket means is coaxial with said pivot mount.

8. Apparatus according to claim 6, wherein said secondary frame includes bracket means to which the one end of said chain or cable means is attached, said bracket means having a plurality of attachment points enabling adjustment of an attachment position.

9. Apparatus according to claim 1, wherein said tyne means are fixed to a support extending transversely of said platform means, said support being carried by brackets pivotally attached to said platform means.

10. A bale loading apparatus comprising:

a main frame extending rearwardly from a bale feeder, a secondary frame pivotally mounted to a rear end of said main frame with a pivot axis transverse thereof, actuator means extending between and operatively connected to said main frame and said secondary frame to move said secondary frame between a generally upright position and a generally horizontal position, platform means movably mounted on said secondary frame so as to move laterally thereof, said platform means for supporting a loaded bale, flexible cable or chain means having one end connected to said secondary frame and the other to said platform means, said cable or chain means passing around a first pulley or sprocket means mounted on said main frame spaced from the pivot axis and further engageable with a second pulley or sprocket means mounted coaxial with the pivot axis, at least two bale-engaging tynes carried on a support pivotally mounted to said platform means whereby said support restricts pivotal movement of said tynes in one direction, and bale delivering means on said main frame, said bale delivering means movable to deliver a bale from said platform means, when said platform means is in a generally horizontal, delivery position, to said bale feeder.

11. Apparatus according to claim 10, wherein said bale delivering means comprises a pair of fork members pivotally attached to said main frame and extending rearwardly to lie adjacent said secondary frame, and actuating means to move said fork members about a pivotal axis thereof.

\* \* \* \* \*